(No Model.)

W. SMITH.
BICYCLE.

No. 469,753. Patented Mar. 1, 1892.

Witnesses:— Edward Hilton Davies Rice
Jesse Varis

Inventor:
William Smith

UNITED STATES PATENT OFFICE.

WILLIAM SMITH, OF HANLEY, ENGLAND.

BICYCLE.

SPECIFICATION forming part of Letters Patent No. 469,753, dated March 1, 1892.

Application filed May 20, 1891. Serial No. 393,468. (No model.) Patented in England January 19, 1891, No. 923.

*To all whom it may concern:*

Be it known that I, WILLIAM SMITH, a citizen of the United Kingdom, residing at 63 Piccadilly, Hanley, in the county of Stafford, England, have invented new and useful improvements in the construction of the framing or forks of bicycles, tricycles, or similar velocipedes for reducing the vibration of such machines while being ridden, (for which I have applied for a patent by provisional protection in Great Britain on the 19th day of January, 1891, and which application was numbered 923,) of which the following is a specification.

My invention relates to improvements in the construction of the framing or forks of bicycles, tricycles, or similar velocipedes; and the object of my improvements is to reduce the vibration of such machines while being ridden. I attain this object by the mechanism illustrated in the accompanying drawings, in which—

Figure 1:
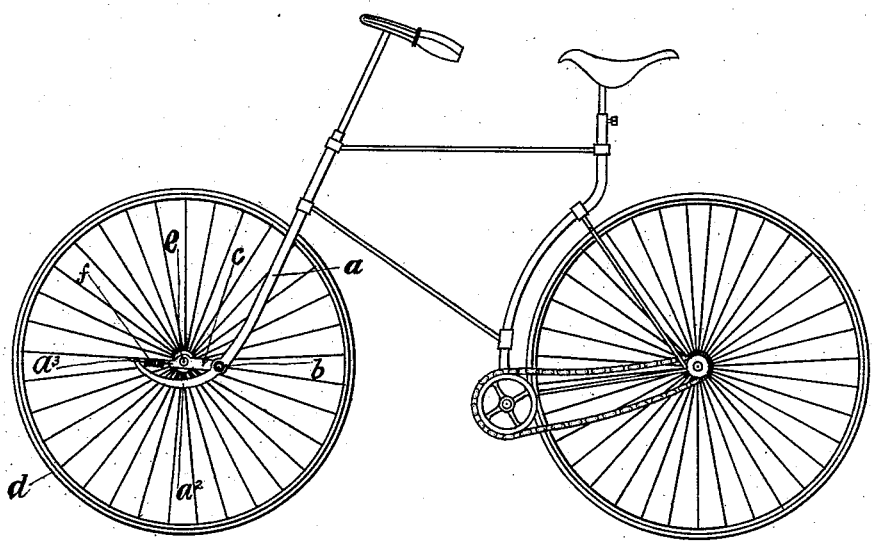
Figure 2:
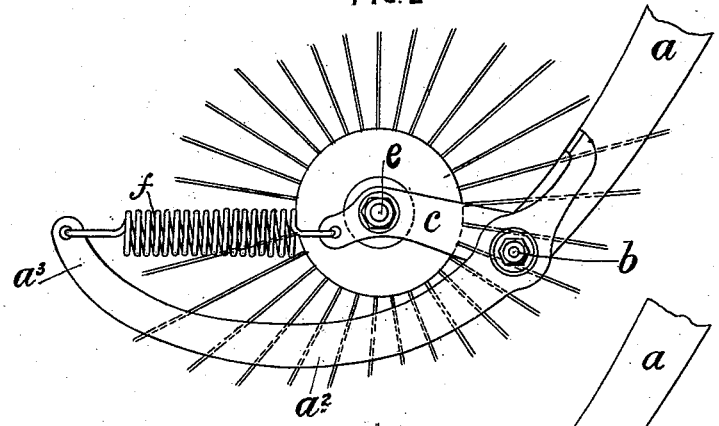
Figure 3:
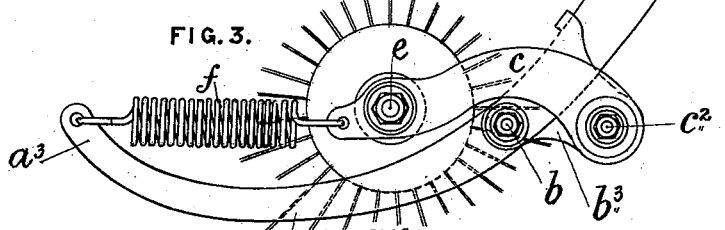
Figure 4:
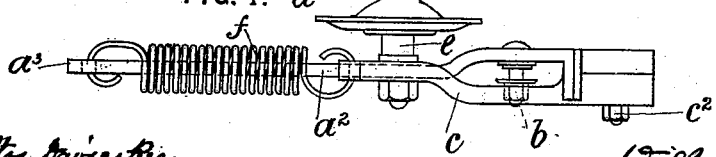

Figure 1 is a side elevation of a cycle or velocipede, usually known as a "diamond-frame" Safety bicycle, drawn about one-twelfth of its full size, showing my improved construction of fork with metal plates and springs attached or connected thereto for the purpose of reducing the vibration of such machine or vehicle while being ridden. Fig. 2 is a side elevation of one of the prongs of my improved fork, showing one of the metal plates and springs connected thereto, the said prongs being attached or connected to the lower end of the fork of an ordinarily-constructed bicycle by means of a bolt and nut. Fig. 3 is a modification of Fig. 2, and Fig. 4 is a plan view of Fig. 3, Figs. 2, 3, and 4 being drawn about one-half of their full size.

Similar letters refer to similar parts throughout the several views.

In Fig. 1 it will be seen that the lower end $a^2$ of the metal fork $a$ is made somewhat in the form of a segment of a circle. A short distance above the lower part of and on each side of the lower part $a^2$ of the metal fork $a$ I attach, by means of a bolt and nut $b$, a metal plate, of any suitable shape and size, so that the said plates $c$ are capable of vibrating on the said bolt, the front wheel $d$ of the machine being fitted or fixed on an axle $e$, which axle is capable of rotating or being rotated in suitable bearings formed in or through the metal plates $c$. To the free end of each of the metal plates $c$ I attach or connect one end of a metallic spring $f$, of suitable shape and size. The outer end of each of the metallic springs $f$ I attach or secure to each of the upturned ends $a^3$ of the prongs of the metal fork in any suitable manner.

In Fig. 2, $a$ is the lower part of an ordinarily-constructed metal fork of a bicycle, having lower metal parts or arms $a^2$ somewhat in the form of a segment of a circle secured to each prong of the said fork by means of a bolt and nut $b$, the said bolt passing through the holes or bearings in which the axle of the wheel of an ordinary bicycle or tricycle revolves. At or near each end of the bolt $b$ connecting the segmental arms $a^2$ to the fork $a$ I place a metal plate $c$, which plates are capable of vibrating thereon. The axle $e$ of the wheel or wheels of a cycle would be fitted in and capable of rotating in suitable bearings formed in or through the metal plates $c$. To the free end of each of the metal plates $c$ I attach one end of a metallic spring $f$ of suitable shape and size. The outer end of each of the metallic springs $f$ I attach or secure to each of the upturned ends $a^3$ of the metal prongs or arms $a^2$ of the fork $a$ in any suitable manner.

In Fig. 3, which is a modification of Fig. 2, the prongs or arms $a^2$, somewhat in the form of a segment of a circle, are secured one to each prong of an ordinarily-constructed fork of a cycle by means of a bolt and nut $b$, the said bolt $b$ passing through the holes or bearings in which the axle of a wheel of an ordinarily-constructed cycle revolves. To a projection $b^3$, formed on each of the prongs or arms $a^2$ or on the lower part of the fork $a$, I secure or attach a suitably-shaped metal plate $c$, by means of a bolt and nut $c^2$, on or near the ends of which bolt the said metal plates $c$ are capable of vibrating. The axle $e$ of the wheel or wheels of a cycle would be capable of rotating in suitable bearings formed in or through the metal plates $c$. To the inner or free end of each of the said metal plates $c$ I attach one end of metallic springs $f$. The outer end of each of the said metallic springs $f$ I attach or secure to each of the upturned ends $a^3$ of the metal prongs or arms $a^2$ of the fork $a$ in any suitable manner. It will be understood that when the front wheel $d$ of a cycle or similar machine is fitted with a fork or detachable arms or prongs made according to my invention comes into contact with and passes over any obstacle in its path. The concussion caused will be compensated by means of the springs $f$ and metal plates $c$.

Although I have described my improved framing or forks and detachable prongs or arms in connection with the front wheel of a bicycle, I wish it to be understood that the said improved construction of framing or forks and the detachable prongs or arms can be applied or adapted to the hind wheel or wheels of such machines or vehicles in a somewhat similar manner to that described in connection with the front wheel of such velocipedes. It will be understood that metallic springs may be used in lieu of the metal plates $c$, if desired. Should the fork $a^2$ or either of the springs be accidentally or otherwise broken or damaged or rendered useless, the nut $b$ on Figs. 1 and 2 and $c^2$ on Figs. 3 and 4 can be screwed up tightly with a spanner or other suitable means, so as to grip or jam the plates $c$ against the sides of the fork and render them rigid, so that the bicycle or the like can be ridden until arriving at a place where the damaged or broken parts could be repaired or replaced.

What I claim as my invention, and desire to secure by Letters Patent, is—

The construction and adaptation to the framing or forks of bicycles, tricycles, or such like machines or vehicles of detachable metal prongs or arms $a^2$, combined with metal plates $c$, metal springs $f$, and the bolts and nuts $b\ c^2$ or the like for the purpose of reducing the vibration of such machines or vehicles while being ridden, substantially as herein described, and substantially for the purpose set forth.

In testimony that I claim the foregoing I have hereunto set my hand this 14th day of April, 1891.

WILLIAM SMITH.

Witnesses:
 EDWARD WILTON DAVIES REES,
 JESSE NORRIS.